US009970525B2

(12) United States Patent
Zaers et al.

(10) Patent No.: US 9,970,525 B2
(45) Date of Patent: May 15, 2018

(54) COUPLING ASSEMBLY WITH A TARGET ELEMENT (71) Applicants: GKN Driveline International GmbH, Lohmar (DE); GKN Driveline Bruneck AG, Bruneck (IT)

(72) Inventors: Colin Zaers, Königswinter (DE); Michael Schwekutsch, Wermelskirchen (DE); Nikolaus Mayr, Bruneck (IT)

(73) Assignees: GKN Automotive Limited, Redditch, Worcestershire (GB); GKN Driveline Bruneck AG, Bruneck (IT)

( * ) Notice: Subject to any disclaimer, the term of this patent is extended or adjusted under 35 U.S.C. 154(b) by 131 days.

(21) Appl. No.: 15/034,962

(22) PCT Filed: Nov. 26, 2013

(86) PCT No.: PCT/EP2013/074767
§ 371 (c)(1),
(2) Date: May 6, 2016

(87) PCT Pub. No.: WO2015/078488
PCT Pub. Date: Jun. 4, 2015

(65) Prior Publication Data
US 2016/0273637 A1    Sep. 22, 2016

(51) Int. Cl.
*F16H 48/24*    (2006.01)
*F16H 48/08*    (2006.01)
*F16H 48/34*    (2012.01)

(52) U.S. Cl.
CPC ............. *F16H 48/24* (2013.01); *F16H 48/08* (2013.01); *F16H 48/34* (2013.01); *F16H 2048/346* (2013.01)

(58) Field of Classification Search
CPC ........................... F16H 2048/346; F16H 48/34
See application file for complete search history.

(56) References Cited

U.S. PATENT DOCUMENTS 5,727,666 A * 3/1998 Maucher ............... F16D 13/585
                                                             192/111.19
2002/0155913 A1  10/2002 Fusegi et al.
(Continued)

FOREIGN PATENT DOCUMENTS

DE     102009056088 A1    9/2011
EP         1079148 A1     2/2001

OTHER PUBLICATIONS

International Search Report and Written Opinion for PCT/EP2013/074767 dated Aug. 6, 2014 (10 pages).

*Primary Examiner* — Stacey Fluhart
(74) *Attorney, Agent, or Firm* — Bejin Bieneman PLC (57) ABSTRACT A coupling assembly comprises a coupling which is arranged between a driving gear and a differential drive; a controllable actuator for actuating the coupling; a sensor for determining switching positions of the coupling; and a target element which cooperates with the sensor, wherein the target element is axially moved upon actuation of the actuator; wherein a first coupling part of the coupling is connected to a differential carrier of the differential drive and wherein a second coupling part of the coupling is held in a rotationally fixed and axially movable way relative to a differential housing of the differential drive, and wherein the target element is secured to the second coupling part by a bayonet-type connection.

20 Claims, 6 Drawing Sheets (56) References Cited

U.S. PATENT DOCUMENTS

2010/0258399 A1\* 10/2010 Simon .................. F16D 13/585
 192/70.252
2017/0191556 A1\* 7/2017 Cochren ................. F16H 48/34

\* cited by examiner

FIG. 7

COUPLING ASSEMBLY WITH A TARGET ELEMENT

CROSS-REFERENCE TO RELATED APPLICATIONS

This application is a national stage of, and claims priority to, Patent Cooperation Treaty Application No. PCT/EP2013/074767, filed on Nov. 26, 2013, which application is hereby incorporated herein by reference in its entirety.

BACKGROUND

Electric drives have a limited speed range and are therefore mostly used as supplementary drives in a motor vehicle comprising an internal combustion engine in addition to the electric drive. The electric drive is primarily used for low vehicle driving speeds, for example, in urban traffic where there occurs a great deal of starting and braking. There exist good traction conditions and a good driving behaviour due to the availability of a relatively high torque of the electric drive. At higher vehicle speeds, for instance during highway driving, the electric motor is switched off so that the drag moment of the electric motor does not have an adverse effect on the efficiency of the vehicle, and fuel consumption, respectively. The electric motor is switched off by a controllable coupling which is arranged in the driveline between the electric motor and the differential drive.

A differential assembly with a coupling assembly, as described above, is known from DE 10 2009 056 088 A1, in which there is proposed a differential assembly which can reliably identify switching positions of the coupling and which has a space-saving design. The differential assembly comprises a driving gear, a differential drive with an input part and two output parts, with the output parts and the input part to be drivingly connected to one another; a clutch which is arranged between the driving gear and the differential gear, wherein in the closed condition of the clutch, torque is transmitted from the driving gear to the differential gear, and wherein in the open condition of the clutch the transmission of torque is interrupted; as well as a controllable actuator for actuating the clutch and a sensor for determining switching positions of the clutch. A target element which cooperates with the sensor is connected to the second coupling part such that upon actuation of the actuator the target element is axially moved together with the second coupling part. The target element is provided in the form of an annular disc. The annular disc comprises a plurality of axially extending resilient engaging elements which form-lockingly engage corresponding recesses in the second coupling part.

SUMMARY

Disclosed herein, and claimed in the various independent and dependent claims, is an improvement to the initially described coupling assembly and the initially described differential assembly such that the target element can be easily mounted to the second coupling part and that a safe connection is provided between the target element and the second coupling part.

A coupling assembly, more particularly for a motor vehicle driving axle drivable by an electric motor, comprises a coupling which is arranged between a driving gear and a differential drive, a controllable actuator for actuating the coupling, a sensor for determining switching positions of the coupling, and a target element which cooperates with the sensor such that the target element is moved axially upon actuation of the actuator, wherein a first coupling part of the coupling is connected to a differential carrier of the differential drive and wherein a second coupling part of the coupling is held in a rotationally fixed and axially movable way relative to the differential housing of the differential drive.

Furthermore, a differential assembly, more particularly for a motor vehicle driving axle drivable by an electric motor, comprises a driving gear and a differential drive with an input part and two output parts, wherein the output parts are drivingly connected to the input part and have a differential effect relative to one another, the differential assembly further comprising a coupling assembly with a coupling which is arranged between the driving gear and the differential drive.

In general, the target element is fixed to the second coupling part by a connection in the form of a bayonet coupling. In the present disclosure, "bayonet coupling" refers to a form-fitting connection in an axial direction, which can be produced when the target element is inserted in the axial direction into or onto the second coupling part and is subsequently rotated relative thereto. The bayonet coupling can also be disconnected. The presently disclosed coupling assembly is not restricted to being used in a differential drive. Those versed in the art know that the coupling assembly can also be arranged between a driving source and any other component within the driveline. The "axial direction" in the context of this disclosure is the direction in which the second coupling part can be moved relative to the first coupling part in order to be engaged with same for the transmission of torque.

An advantage of the proposed method of fixing the target element is that it permits a separate introduction of torque into the second coupling part so that any deformation of the target element due to the influence of an actuation force can be advantageously minimised or even avoided. The form-fitting connection between the target element and the second coupling part advantageously provides a secure axial connection of the target element.

In one example, the second coupling part comprises a plurality of circumferentially distributed axial projections, wherein at least one of the axial projections comprises a groove portion, wherein said groove portion is arranged along the outer circumference of the second coupling part. "At least one" in this context means that one, some, or all of the axial projections can be provided with a groove portion at an outer circumference of the second coupling part. The groove portions can be arranged in one common plane extending perpendicularly to the axis of rotation of the second coupling part. In an example wherein all axial projections comprise a respective groove portion, said groove portions altogether can be seen to form a circumferentially extending groove which is interrupted in the regions between two circumferencially adjacent axial projections.

According to a further example, the at least one axial projection can comprise an axial recess configured such that the target element can be axially moved onto the second coupling part until the target element axially abuts an abutment face of the axial projection before subsequently being rotated to engage the groove. In other words, the abutment faces define the plane in which the target element is aligned in a circumferential direction with the grooves of the second coupling part, so that the target element can be rotated to engage the grooves.

The target element can be provided in the form of an annular disc and comprises a plurality of circumferentially distributed, radially inwardly extending tongue portions. At least one of the tongue portions can be made to engage the groove portion of the at least one axial projection by rotating the target element relative to the second coupling part. In this context at least one of the tongue portions means that one, some, or all of the tongue portions can be configured to engage a respective groove portion of a respective axial projection of the second coupling part. In an example, the target element is axially pretensioned by a spring relative to the second coupling part, as a result of which a play of the tongue portions in the groove portions can be advantageously compensated for. In an advantageous example, there are provided at least three axial projections with groove portions and at least three tongue portions in order to ensure that the target element is radially centred relative to the second coupling part in a built-in condition.

According to a further preferred embodiment it is proposed that at least one of the tongue portions comprises at least one securing portion which projects in the circumferential direction beyond the associated groove portion, wherein, by deforming the securing portion, the target element can be secured against rotating relative to the second coupling part. This means that at least one tongue portion comprises one or two securing portions which includes the possibility that only one tongue portion comprises two securing portions, or that more than one tongue portions comprise one or more securing portions. More particularly, the securing portions can be bent or crimped for rotationally fixing the target element to the second coupling part, so that a form-locking connection is produced in the circumferential direction.

According to a further example, at least one of the axial projections of the second coupling part comprises a bore extending transversely to the groove portion, and furthermore, it is possible that at least one of the tongue portions is fixed in the circumferential direction by a securing pin introduced into the bore in such a way that there is provided alternative or additional security to prevent the target element from rotating relative to the second coupling part. For this purpose, the at least one tongue portion can comprise a recess for receiving the respective securing pin. More particularly, it is possible that the recess for receiving the securing pin is radially inwardly opened, as a result of which it is particularly easy to produce the target element by punching without the recesses subsequently having to be bored.

According to a further example, the target element is produced in the form of a substantially flat part, which can be produced more particularly by stamping or punching. The axial projections can comprise inner recesses for receiving a sliding bush, with the groove portions being arranged axially in the region of the inner recesses.

A differential assembly as disclosed herein, more particularly for a motor vehicle driving axle drivable by an electric motor, comprises a driving gear and a differential drive with an input part and two output parts, wherein the output parts are drivingly connected to the input part and have a differential effect relative to one another, as well as a coupling assembly as described above, with the coupling being effectively arranged between the driving gear and the differential drive.

The input part of the differential drive can be configured in the form of a differential carrier for example. If a bevel gear differential or a crown gear differential is used, the output parts can be sideshaft gears or, if a planetary gear differential is used, they can be a hollow gear or a sun gear.

SUMMARY OF THE DRAWINGS

Below, the invention will be explained in greater detail with reference to embodiments according to the enclosed drawings. Said embodiments do not limit the general idea of the invention.

DETAILED DESCRIPTION

Figure 1:
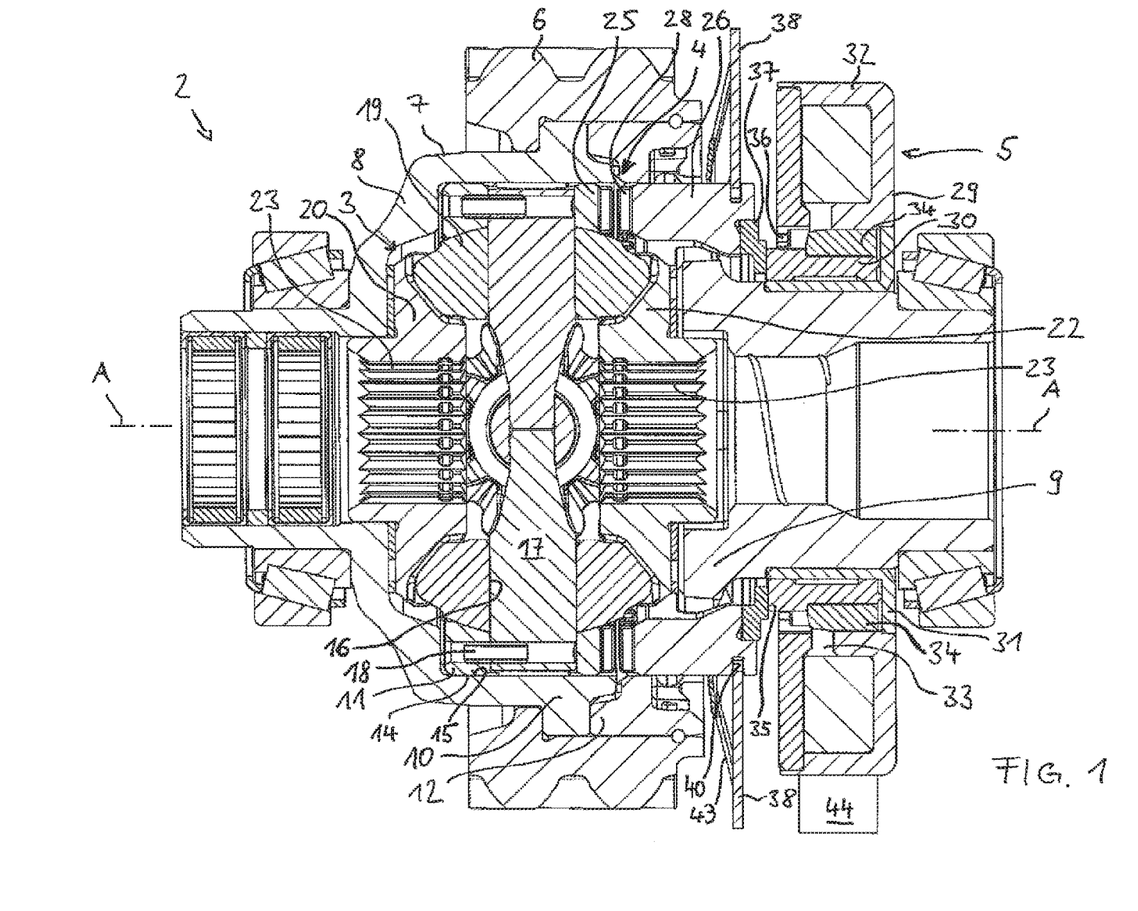
FIG. 1 is a sectional illustration of an exemplary differential assembly with an exemplary coupling assembly.

FIG. 1 shows an exemplary differential assembly 2 with an exemplary coupling assembly. The differential assembly 2 comprises a differential drive 3, a coupling 4 and an actuator 5 for actuating the coupling 4. For introducing a torque from a driving motor (not illustrated), there is provided a driving gear 6 which is fixedly connected to a differential housing 7, more particularly by welding. It is to be understood that the connection between the driving gear and the differential housing can also be produced in other ways for example in the form of a bolted connection or other commonly used connecting means. The differential housing is provided in two parts and comprises a first substantially cup-shaped housing part 8 and a second substantially cup-shaped housing part 9 which, in their region of their aperture-facing ends, each comprise a flange portion 10, 12 by means of which they are connected to the driving gear 6. The first housing part 8 accommodates the differential drive 3 which can be driven so as to rotate around the axis of rotation A.

The differential drive 3 comprises a differential carrier 11 which comprises a substantially cylindrical outer face 14 by means of which the differential carrier 11 is rotatingly supported relative to a corresponding internally cylindrical portion 15 of the first housing part 8 around the axis of rotation A. In the differential carrier 11 there are provided two bores 16 into which a journal 17 is inserted and fixed by a securing pin 18. Two differential gears 19 are rotatingly supported on the journal 17 around a journal axis. The two differential gears 19 engage two sideshaft gears 20, 22 which are arranged coaxially relative to the axis of rotation A. The two sideshaft gears 20, 22 each comprise inner splines 23 into which corresponding outer splines of a sideshaft (not shown) can be inserted for transmitting torque. The first sideshaft gear 20 is axially supported relative to the first housing part 8, and, possibly, a friction disc is arranged between the first sideshaft gear 20 and the supporting face of the first housing part 8. Accordingly, a friction disc is also arranged between the second sideshaft gear 22 and the second housing part 9 in order to support axial forces.

In the present example, the coupling 4 is provided in the form of a form-fitting coupling, more particularly a toothed coupling, which can also be referred to as a dog clutch.

However, it is understood that other coupling types can also be used, for example a friction coupling. The form-fitting coupling 4 comprises a first coupling part 25 which is fixedly connected to the differential carrier 11, as well as a second coupling part 26 which is axially movable relative to the first coupling part 25. For the purpose of transmitting torque, the second coupling part 26 can be made to engage the first coupling part 25, which results into a form-fitting connection between the two coupling parts 25, 26. By disengaging the second coupling part 26, the transmission of torque can be interrupted. The first coupling part 25 comprises a toothed ring as a form-fitting means, which toothed ring is integrally formed on an end face of the differential carrier 11. Accordingly, the second coupling part 26 comprises a corresponding toothed ring 28 which is arranged inside the differential housing 7. In this example, the axis of rotation A extends in the axial direction of the movement of the second coupling part 26 relative to the first coupling part 25.

By suitably controlling the actuator 5, the second coupling part 26 can be axially moved relative to the first coupling part 25, with a transmission of torque from the driving gear 6 to the differential gear 3 being ensured in the engaged condition, whereas in the disengaged condition the transmission of torque is interrupted. The actuator 5 comprises an electro-magnet 29 as well as a piston 30, with the actuator being designed such that, when the electric motor is supplied with current, the piston 30 is moved in the direction of the coupling 4. For this purpose, the electro-magnet comprises an annular housing 32 which comprises an aperture at its radially inner end facing the coupling 4. The piston 30 is axially movably arranged inside said housing portion. The housing 32 is arranged by means of a carrier element 31 on a sleeve projection of the second housing part 9. The piston 30 comprises an anchor element 34 consisting of a ferro-magnetic material, for instance an iron material, as well as a sleeve 35 consisting of a para-magnetic material, for instance high-grade steel, copper or aluminium.

The anchor element 34 is sleeve-shaped and pressed onto the sleeve 35. Because the anchor element consists of a ferro-magnetic material, it is moved towards the coupling 4 when the electro-magnet is actuated, with the gap 33 being bridged. In its end position, the anchor element 34 contacts a shoulder 36 of the magnet housing 32 in order to prevent an undesirable leakage of magnetic flow towards the other components. The sleeve 35 is axially longer than the anchor element 34, and comprises an end face which contacts a sliding ring 37. The sliding ring 37, in turn, is directly axially supported relative to the second coupling part 26. A target element 38 is provided in the form of an annular disc, with further details being given with reference to the following Figures.

The target element 38 form-fittingly engages corresponding undercuts 40 of the second coupling part 26. A returning spring 43 is arranged between the differential housing 7, i.e., between the second housing part 9 and the target element 38. The returning spring 43 is pretensioned so as to load the target element 38, via the second coupling part 26 connected thereto, towards the actuator 5, i.e., in an opening of the coupling 4. In the present example, the returning spring 43 is provided in the form of a plate spring, but other types of spring, for example a helical spring, can also be used. Furthermore, there is provided a sensor 44 which is axially arranged in the region of the actuator 5 and cooperates with the target element 38. The sensor 44 and the target element 38 are configured such that the switching condition of the coupling 4 can be identified. The sensor detects a signal representing the distance between the sensor and the target element 38, which can thus also be referred to as sensor object. The sensor 44 can be provided for example in the form of a Hall sensor which can record the distance from the target element 38 in a contact-free way. However, it is also possible to use a contact-free sensor, for instance, an inductive sensor.

Figure 2:
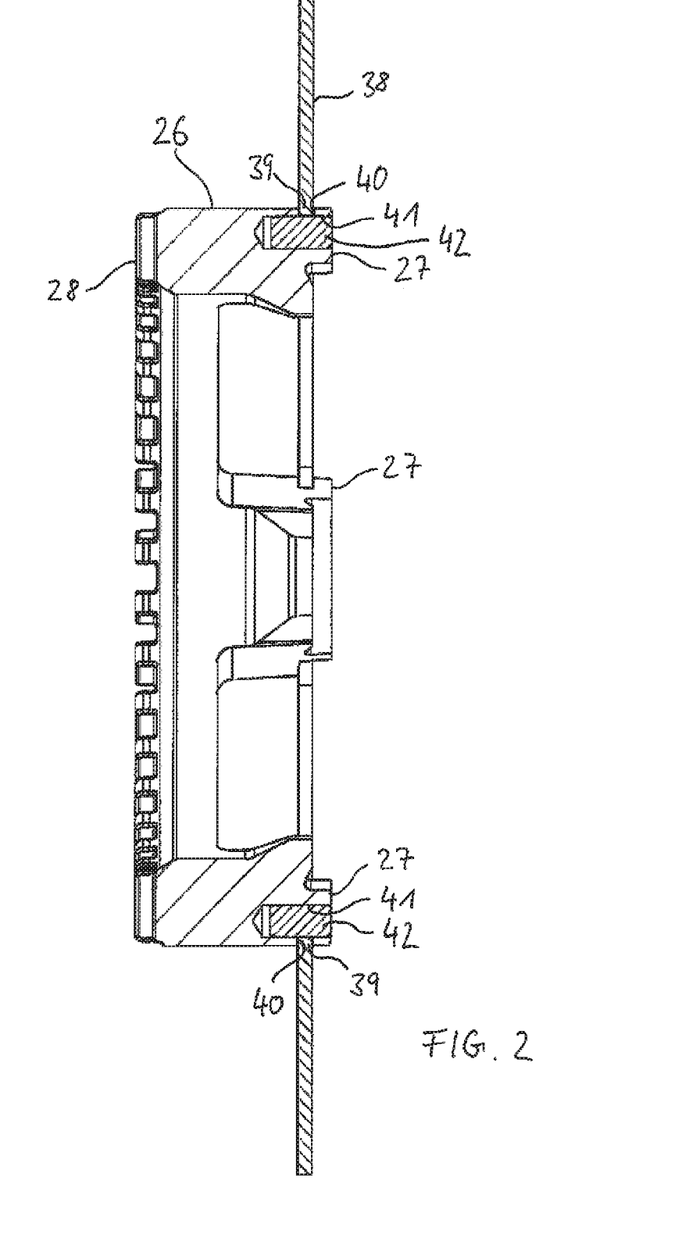
FIG. 2 is a sectional illustration of a second coupling part with a target element of the coupling assembly according to FIG. 1 being fixed thereto.
Figure 3:
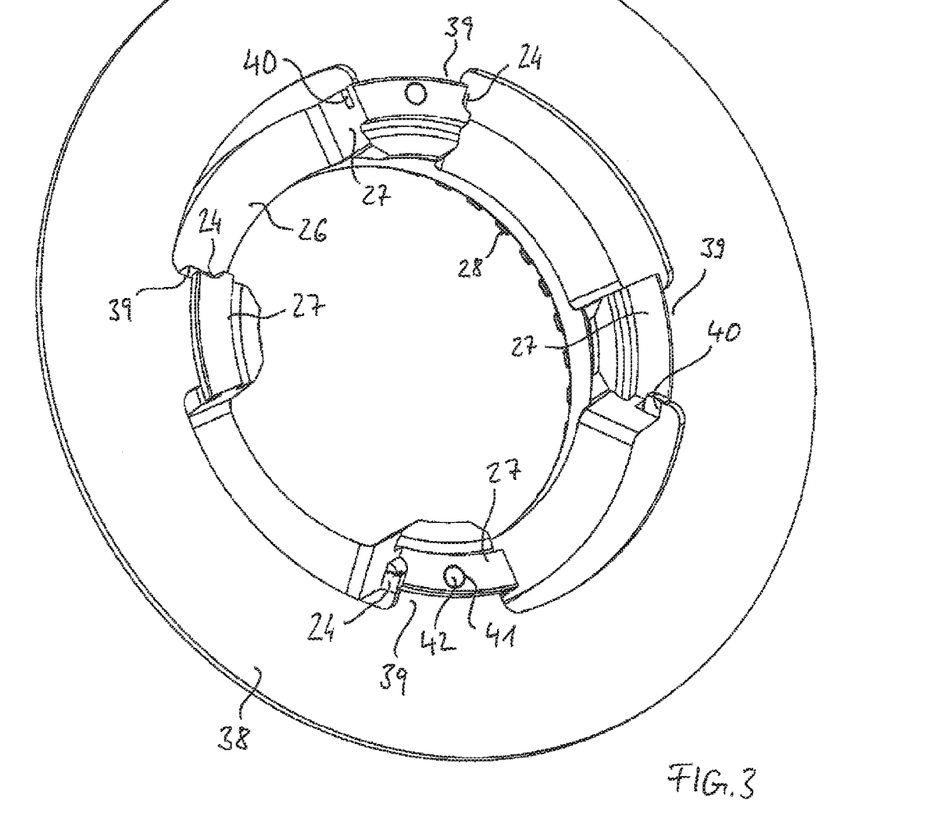
FIG. 3 is a perspective view of the second coupling part with the target element being fixed thereto according to FIG. 2.

FIGS. 2 and 3 show the second coupling part 26 with the target element 38 fixed thereto as comprised by the coupling assembly according to FIG. 1 in the form of a detail in a sectional view (FIG. 2) and in a perspective view (FIG. 3). In the following, the FIGS. 2 and 3 are jointly described. The second coupling part 26, at its end face, comprises the above-described toothed ring 28. At its face facing away from the toothed ring 28, the second coupling part 26 comprises a plurality of circumferentially distributed, axial projections 27 which pass through corresponding through-apertures of the differential housing 7 (see FIG. 1).

The target element 38 is secured to the second coupling part 26 by a connection of the bayonet type. For this purpose, the axial projections 27 comprise interrupted groove portions 40 arranged along an outer circumference of the second coupling part 26. The target element 38 is configured in the form of an annular disc and comprises a plurality of circumferentially distributed, radially inwardly extending tongue portions 39 which, by rotating the target element 38 relative to the second coupling part 26, can be made to engage the groove portions 40. Before being rotated, the target element 38 can be axially moved towards the second coupling part up to an abutment face.

The axial projections 27 each comprise an axial recess 24 for facilitating mounting of the target element 38. The axial recesses 24 are more particularly configured as cut away portions such that the target element 24 can be axially moved onto the second coupling part until an end face of the tongue portions 39 axially abuts a respective abutment face of the axial projection 27. The abutment face of the axial projection 27 forms the base of the axial recess 24 and, at the same time, a circumferentially extending portion of one of the side walls of the groove 40. Thus, the abutment faces of the axial recesses 24 define the axial position in which the target element 38 can be rotated relative to the second coupling part 26 such that the tongue portions 39 engage the respective groove portions 40.

In the present example, two of the four axial projections 27 comprise a bore 41 which extends transversely to the groove portion 40 with the tongue portions 39 being circumferentially secured to the respective axial projection 27 by a securing pin 42 introduced into the bores 41. Thus, the target element 38 is rotationally fixed to the second coupling part 26, i.e., cannot rotate relative to the second coupling part 26. Further details of the target element 38 and of the second coupling part 26 will be described in detail with reference to FIGS. 4 and 5.

Figure 4:
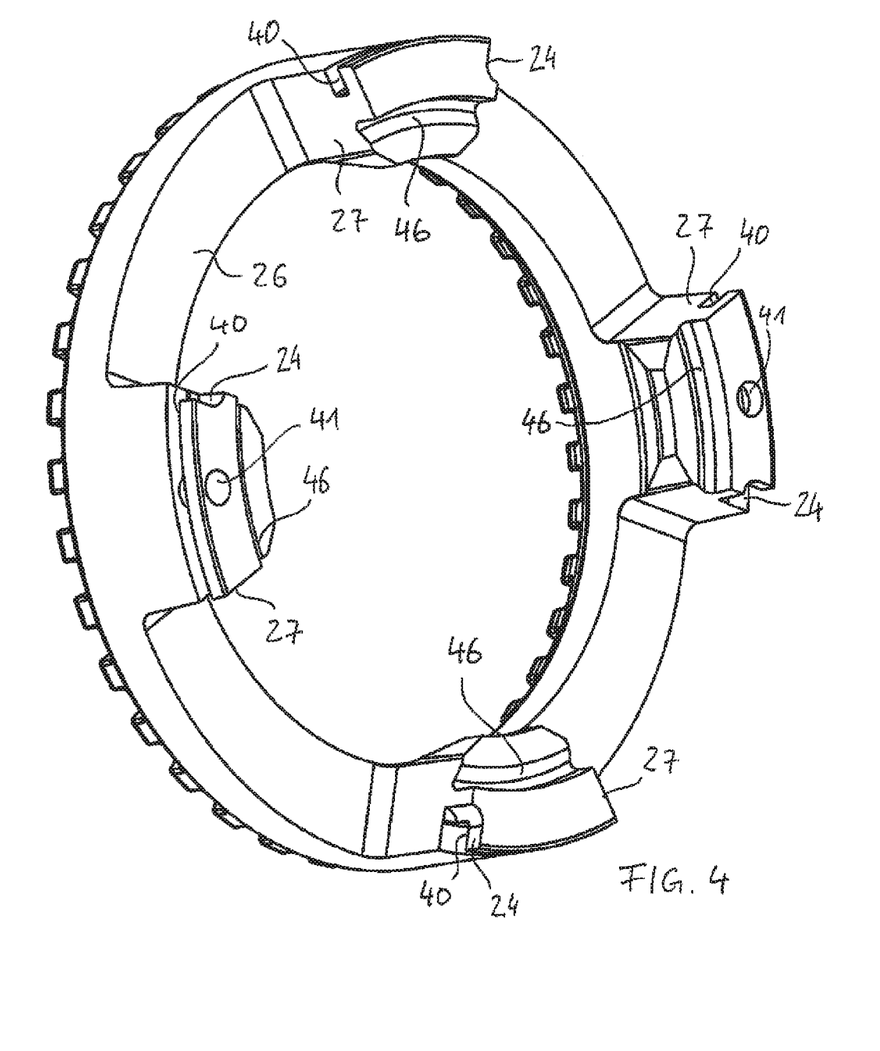
FIG. 4 is a perspective view of the second coupling part on its own according to FIG. 3.

FIG. 4 shows the second coupling part 26 according to FIG. 3 individually in the form of a perspective illustration. It can be seen that the axial projections 27 comprise inner recesses 46 which are provided for accommodating the sliding ring 37 (see FIG. 1), wherein the groove portions 40 are arranged axially in the region of said inner recesses 46. This type of the second coupling part 26 allows the force to be introduced via the sliding ring 37 directly to the second coupling part 26 to engage same in the axial direction, as described above with reference to FIG. 1. By securing the target element 38 via a bayonet-type connection on the outside of the coupling part 26, the target element 38 is advantageously not force-loaded, when the second coupling part 26 is made to engage the first coupling part 25.

Figure 5:
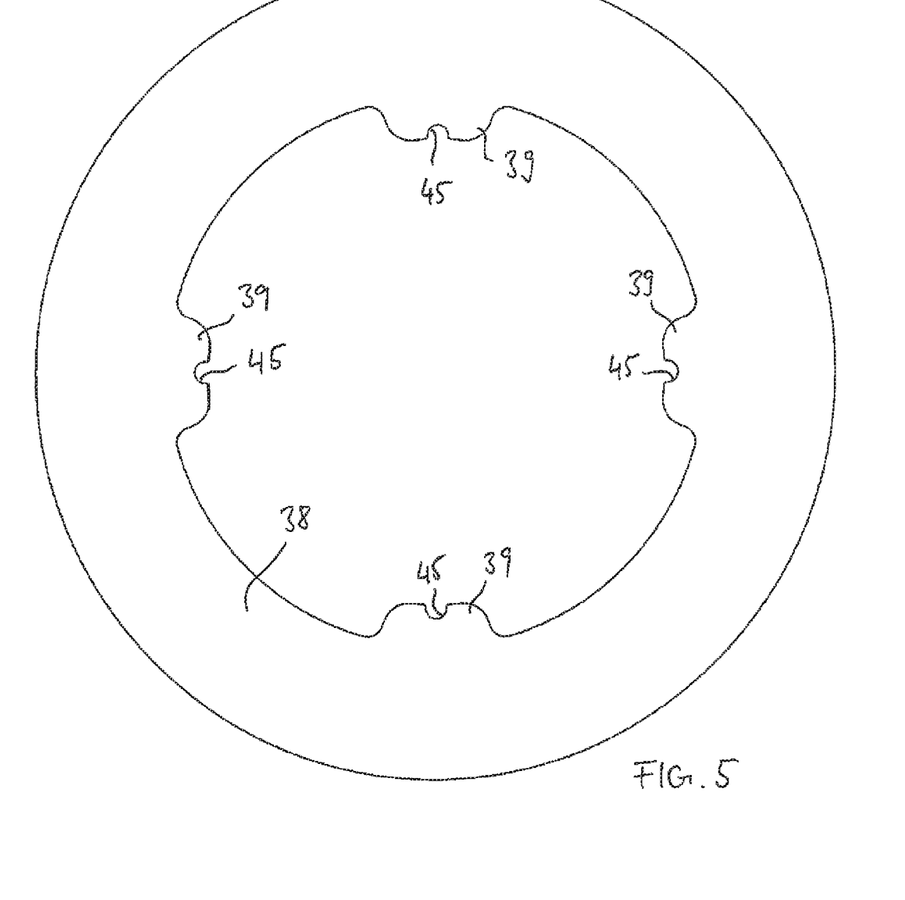
FIG. 5 is an axial view of the target element according to FIG. 3 in the form of a detail.

FIG. 5 shows the target element 38 according to FIG. 3 in the form of a detail. The tongue portions 39 each comprise a recess 45 for receiving a securing pin 42 (see FIG. 3), with said recesses 45, in this example, opening inwardly. This type of target element 38 advantageously allows it to be produced substantially as a flat punched part.

Figure 6:
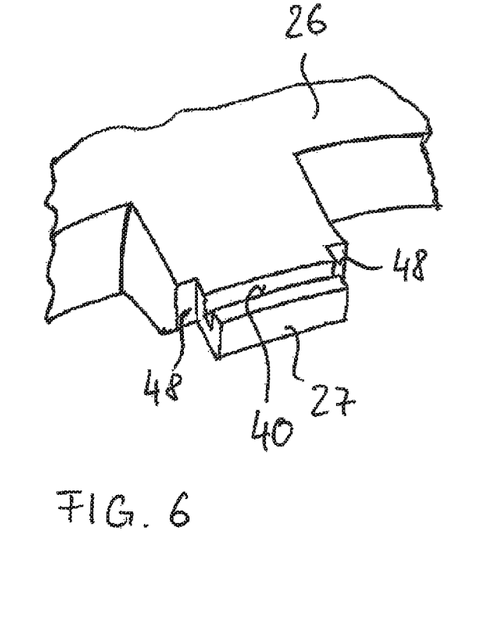
FIG. 6 is a perspective detail of an another example of the second coupling part.
Figure 7:
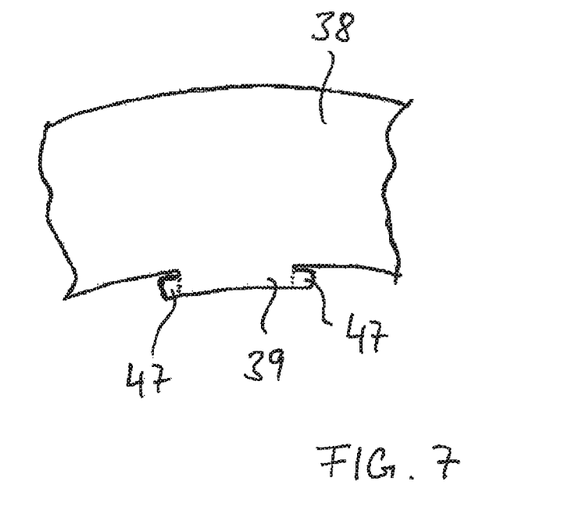
FIG. 7 is a perspective detail of an another example of the target element.

FIG. 6 shows a detail of an alternative example of the second coupling part 26 individually in a perspective view, with only one section with an axial projection 27 being illustrated. This example will be described jointly with the associated alternative example of the target element 38 as illustrated in FIG. 7. Again, only a section with a tongue portion 39 is shown of the target element 38, by means of which tongue portion 39 the target element 38 is secured to the second coupling part 26 by a bayonet-type coupling. For this purpose, in this example, the axial projections 27 also comprise the groove portions 40 which receive radially inwardly extending tongue portions 39 by the target element 38 rotating relative to said second coupling part 26.

In the present example, at least one of the tongue portions 39 comprises two securing portions 47 which, in the built-in condition of the target element 38 at the second coupling part, project beyond the groove portion 40 in the circumferential direction. By deforming the securing portions 47 into the recesses 48 at the projection 27, the target element 38 is secured against rotating relative to the second coupling part 26.

The invention claimed is:

1. A coupling assembly, comprising:
a coupling arranged between a driving gear and a differential drive;
a controllable actuator arranged to actuate the coupling;
a sensor arranged to determine switching positions of the coupling; and
a target element which cooperates with the sensor, wherein the target element is axially moved upon actuation of the actuator;
wherein a first coupling part of the coupling is connected to a differential carrier of the differential drive and wherein a second coupling part of the coupling is held in a rotationally fixed and axially movable way relative to a differential housing of the differential drive,
wherein the target element is secured to the second coupling part by a bayonet-type connection;
wherein the target element is axially pre-tensioned relative to the second coupling part by a spring.

2. The coupling assembly of claim 1, wherein the second coupling part comprises a plurality of circumferentially distributed axial projections, wherein at least one of the axial projections comprises a groove portion arranged along an outer circumference of the second coupling part.

3. The coupling assembly of claim 2, wherein the target element is provided in the form of an annular disc and comprises a plurality of circumferentially distributed, radially inwardly extending tongue portions.

4. The coupling assembly of claim 3, wherein, by rotating the target element relative to the second coupling part, at least one of the tongue portions can be made to engage the groove portion of the at least one axial projection.

5. The coupling assembly of claim 3, wherein at least one of the tongue portions comprises at least one securing portion which, in a circumferential direction, projects beyond an associated groove portion, wherein, by deforming the securing portion, the target element can be secured relative to the second coupling part in a rotationally fixed way.

6. The coupling assembly of claim 3, wherein at least one of the tongue portions comprises a recess for receiving a securing pin.

7. The coupling assembly of claim 2, wherein at least one of the axial projections comprises a bore extending transversely to the groove portion.

8. The coupling assembly of claim 7, wherein at least one of the tongue portions is secured by a securing pin introduced into the bore, such that the target element is connected to the second coupling part in a rotationally fixed way.

9. The coupling assembly of claim 2, wherein at least one axial projection comprises an axial recess configured such that the target element can be made to axially abut an abutment face of the axial projection before subsequently being rotated to engage the groove portion.

10. The coupling assembly of claim 1, wherein there are provided at least three axial projections with groove portions and at least three tongue portions such that, in a built-in condition, the target element is centred radially relative to the second cooling part.

11. A coupling assembly, comprising:
a coupling arranged between a driving gear and a differential drive;
a controllable actuator arranged to actuate the coupling;
a sensor arranged to determine switching positions of the coupling; and
a target element which cooperates with the sensor, wherein the target element is axially moved upon actuation of the actuator;
wherein a first coupling part of the coupling is connected to a differential carrier of the differential drive and wherein a second coupling part of the coupling is held in a rotationally fixed and axially movable way relative to a differential housing of the differential drive,
wherein the target element is secured to the second coupling part by a bayonet-type connection,
wherein the second coupling part comprises a plurality of circumferentially distributed axial projections, wherein at least one of the axial projections comprises a groove portion arranged along an outer circumference of the second coupling part,
wherein at least one of the axial projections comprises a bore extending transversely to the groove portion.

12. The coupling assembly of claim 11, wherein the target element is provided in the form of an annular disc and comprises a plurality of circumferentially distributed, radially inwardly extending tongue portions.

13. The coupling assembly of claim 12, wherein, by rotating the target element relative to the second coupling part, at least one of the tongue portions can be made to engage the groove portion of the at least one axial projection.

14. The coupling assembly of claim 12, wherein at least one of the tongue portions comprises at least one securing portion which, in a circumferential direction, projects beyond an associated groove portion, wherein, by deforming the securing portion, the target element can be secured relative to the second coupling part in a rotationally fixed way.

15. The coupling assembly of claim 12, wherein at least one of the tongue portions is secured by a securing pin introduced into the bore, such that the target element is connected to the second coupling part in a rotationally fixed way.

16. The coupling assembly of claim 12, wherein at least one of the tongue portions comprises a recess for receiving a securing pin.

17. The coupling assembly of claim 11, wherein at least one axial projection comprises an axial recess configured such that the target element can be made to axially abut an abutment face of the axial projection before subsequently being rotated to engage the groove portion.

18. The coupling assembly of claim 11, wherein the target element is axially pre-tensioned relative to the second coupling part by a spring.

19. The coupling assembly of claim 11, wherein there are provided at least three axial projections with groove portions and at least three tongue portions such that, in a built-in condition, the target element is centred radially relative to the second coupling part.

20. A differential assembly comprising:
  a driving gear;
  a differential drive with an input part and two output parts, wherein the output parts are drivingly connected to the input part and have a differential effect relative to one another; and
  a coupling assembly arranged between the driving gear and the differential drive, the coupling assembly comprising:
    a coupling arranged between the driving gear and the differential drive;
    a controllable actuator arranged to actuate the coupling;
    a sensor arranged to determine switching positions of the coupling; and
    a target element which cooperates with the sensor, wherein the target element is axially moved upon actuation of the actuator;
  wherein a first coupling part of the coupling is connected to a differential carrier of the differential drive and wherein a second coupling part of the coupling is held in a rotationally fixed and axially movable way relative to a differential housing of the differential drive,
  wherein the target element is secured to the second coupling part by a bayonet-type connection, and
  wherein the target element is axially pre-tensioned relative to the second coupling part by a spring.

* * * * *